(12) United States Patent
Koster et al.

(10) Patent No.: US 9,781,939 B2
(45) Date of Patent: Oct. 10, 2017

(54) DEVICE, WORK STATION AND METHOD FOR CUTTING THE HEAD OFF A SLAUGHTERED ANIMAL'S CARCASS

(71) Applicant: Humboldt B.V., Lichtenvoorde (NL)

(72) Inventors: Niels Antonio William Koster, Beltrum (NL); Leonardus Jozephus Antonius Tiggeloven, Groenlo, NC (US)

(73) Assignee: Humboldt B.V., Lichtenvoorde (NL)

( * ) Notice: Subject to any disclaimer, the term of this patent is extended or adjusted under 35 U.S.C. 154(b) by 0 days.

(21) Appl. No.: 15/322,759

(22) PCT Filed: Jun. 24, 2015

(86) PCT No.: PCT/NL2015/050459
§ 371 (c)(1),
(2) Date: Dec. 29, 2016

(87) PCT Pub. No.: WO2016/003265
PCT Pub. Date: Jan. 7, 2016

(65) Prior Publication Data
US 2017/0135355 A1    May 18, 2017

(30) Foreign Application Priority Data
Jun. 30, 2014  (NL) ...................................... 2013097

(51) Int. Cl.
*A22B 5/00*    (2006.01)
(52) U.S. Cl.
CPC .......... *A22B 5/0052* (2013.01); *A22B 5/0041* (2013.01)

(58) Field of Classification Search
CPC ....... A22B 5/0052; A22B 5/0041; A22B 3/08; A22C 5/0017; B23D 23/00; B23D 29/02; B23D 17/06; B26D 3/16; B21F 1/00; B21F 11/00
USPC .......................... 452/149, 150, 154, 166, 167
See application file for complete search history.

(56) References Cited

U.S. PATENT DOCUMENTS

| | | | |
|---|---|---|---|
| 1,081,851 A | | 12/1913 | Ulyseses |
| 3,816,874 A | * | 6/1974 | Jahnke .................... A22C 17/06 452/167 |
| 4,727,623 A | * | 3/1988 | Durand ..................... A22B 5/16 452/125 |
| 5,083,971 A | * | 1/1992 | Karubian ............. A22B 5/0052 30/245 |

(Continued)

FOREIGN PATENT DOCUMENTS

EP    0635210 A    1/1995

*Primary Examiner* — Richard Price, Jr.
(74) *Attorney, Agent, or Firm* — The Webb Law Firm (57) ABSTRACT

The present invention relates to a device (30) for cutting the head off a slaughtered animal's carcass comprising: at least two knives (31,32), both provided with a cutting edge (33, 34); and controls for moving the knives towards and away from each other such that the cutting edges of the knives cooperate in a cutting action, whereby at least one of the knives is provided with a position-finding protruding cutting edge portion (35,36). The invention also relates to an automatic work station comprising such a cutting device and a manipulator for positioning the cutting device. Furthermore the invention relates to a method for cutting the head off a slaughtered animal's carcass.

18 Claims, 5 Drawing Sheets

(56) References Cited

U.S. PATENT DOCUMENTS

| | | | | | |
|---|---|---|---|---|---|
| 5,454,754 | A | * | 10/1995 | Baertlein | A22C 11/125 30/228 |
| 5,507,688 | A | * | 4/1996 | Van Ochten | A22B 5/0052 452/167 |
| 6,062,971 | A | * | 5/2000 | Baertlein | A22C 11/125 30/92 |
| 6,174,229 | B1 | * | 1/2001 | Nielsen | A22B 5/0005 452/106 |
| 6,461,232 | B1 | * | 10/2002 | Gwyther | A22B 5/0058 452/166 |

* cited by examiner

DEVICE, WORK STATION AND METHOD FOR CUTTING THE HEAD OFF A SLAUGHTERED ANIMAL'S CARCASS

CROSS-REFERENCE TO RELATED APPLICATIONS

This application is the United States national phase of International Application No. PCT/NL2015/050459 filed Jun. 24, 2015, and claims priority to Dutch Patent Application No: 2013097 filed Jun. 30, 2014, the disclosures of which are hereby incorporated in their entirety by reference.

BACKGROUND OF THE INVENTION

The present invention relates to a device for cutting the head off a slaughtered animal's carcass comprising: two knives, both provided with a cutting edge; and controls for moving the knives towards and away from each other such that the cutting edges of the knives cooperate in a cutting action. The present invention also relates to an automatic work station for cutting the head off a slaughtered animal's carcass provided with such a cutting device, as well as to a method for cutting the head off a slaughtered animal's carcass.

FIELD OF THE INVENTION

The prior art cutting devices for mechanical cutting the head off a slaughtered animal's carcass comprise separating devices with driven scissor knives. Such mechanical driven scissors can be manipulated manually or via a mechanical manipulator. An example of such a mechanical manipulator for a pair of separating knives is for instance known from EP 0 212 580. The mechanical positioning of the separating knives in this manipulator can be dependent from a length measurement of the carcass to be cut.

The problem to be solved is that the position of separation of a head of a slaughtered animal's carcass is not well controlled.

SUMMARY OF THE PRESENT INVENTION

As a solution the present invention provides a device for cutting the head off a slaughtered animal's carcass comprising: at least two knives, both provided with a cutting edge; and controls for moving the knives towards and away from each other such that the cutting edges of the knives cooperate in a cutting action, wherein at least one of the knives is provided with a position-finding protruding cutting edge portion, which position-finding protruding cutting edge portion has a forward cutting edge that protrudes compared to two-sided adjoining set back cutting edge portions. The protruding cutting edge portion is located more or less centrally at at least one of the knives as on both sides of the protruding cutting edge portion set back cutting edge portions are provided. As the cutting action starts the protruding cutting edge portion of at least one of the knives will first come in contact with the (neck of) the slaughtered animal's carcass and will this also enter the carcass first. In case the protruding cutting edge portion enters the neck of the slaughtered animal's carcass close to the head the protruding cutting edge portion will make contact with the slaughtered animal's cranium posterior side (crown of the skull). The cranium posterior side that is contacted by the protruding cutting edge portion(s) is defined by the posterior surface of the occipital bone. As the posterior surface of the occipital bone has two slanting (sloping) more or less flat surfaces which lead from the dual sides of the head (skull) upward (that is to say away from the front side of the head) to a location where the two more or less flat surfaces meet at a rounded off ridge. Due to the shape of the cranium posterior side the protruding cutting edge portion(s) are guided along the cranium posterior side (crown of the skull). Due to such guided movement of the protruding cutting edge portion(s) the (whole) knives will be guided during their cutting movement as well as the protruding cutting edge portion(s) is connected to at least one of the knives. As far as one of the knives is not provided with a protruding cutting edge portion such knife will be "dragged along" as for the guiding along the cranium posterior side by another knife that is provided with a protruding cutting edge portion due to the coupling of the knives as the knives have to cooperate in their cutting action.

One of the advantages of guiding the knives along the cranium posterior side is that the knives will cut the neck very close to the head. As the knives are guided by the protruding cutting edge portion(s) along the posterior surface of the occipital bone a closer positioning of the knives during their cutting operation is hardly impossible. This results thus in a separation of the animal's trunk and the head wherein the yield is maximised due to the effect that more meat of the neck remains at the trunk (body) of the carcass than with the prior art separation techniques. A further advantage is that due to the guiding of the knives along the cranium posterior side the knives are prevented from cutting into the cranium posterior side, which implies that there are no (or only minimal) bone fragments in the cut apart trunk and head. It will be clear that minimal presence of bone fragments enhances the quality of the separated carcass parts.

The controls for moving the knives towards and away from each other to provide the required cutting action may comprise a drive system and an intelligent steering system, e.g. an automated steering system provided with one or more sensors for allocating the carcasses and/or allocating specific anatomical characteristics of the carcasses to be processed. Furthermore the knives may be at least two knives which at least two knives may cooperate by passing along each other, e.g. as an upper knife and a lower knife.

However also manual use of the cutting device according the present invention is also an option, especially in those conditions where few carcasses have to be processed, labour is relative cheap and/or carcasses with substantial variation in dimensions have to be processed.

In the situation that two knives are provided with a position-finding protruding cutting edge portion both of the knives may be guided by the cranium posterior side and thus the chances of undesired slanting of the cooperating knives with a risk of cutting into bone is further limited.

In a specific embodiment of the cutting device according the present invention the two knives are forming a pair of shears and the controls are comprising a rotational drive. Such a knife assembly is known as a pair of scissors and enables an easy handling and positioning of the knives as the knives are combined via a mutual shaft (axle). However in an alternative embodiment the two knives may be linear displaceable towards and away from each other and the controls may comprise a linear drive. Such linear displaceable knives may for instance run in linear guides and may be powered by one or more cylinders (pneumatic or hydraulically driven). As an even further embodiment and as an alternative for rotational (scissor) knives and linear displaceable knives also other drive construction may be selected like for instance a drive with a linkage system providing a more complex mutual movement of the knives.

For easy access of the neck of the carcass between the knives before the separation starts the knives may comprise a free side enabling the positioning of the neck of a carcass between moved apart knives. In a further embodiment two cooperating knives may each have a free side enabling the easy access for the neck of a slaughtered animal's carcass to be cut.

Yet another embodiment of the cutting device according the present invention is provided with three cooperating knives, of which three knives two may be positioned on opposite sides of the neck to be separated and a third knife to be moved along the two other knives so to provide the required neck cutting. As for the positioning of the neck of the carcass between the knives and for optimising the cutting action the knives may have substantially concave curved cutting edges.

The position-finding protruding cutting edge portion may be integrated with the two-sided adjoining set back cutting edge portions. Such knife construction is relatively easy to manufacture and is easy in use providing minimal demand for maintenance and repair. As an alternative it is also possible to provide a position-finding protruding cutting edge portion that is moveably connected with the two-sided adjoining set back cutting edge portions. Such moveable position-finding protruding cutting edge portion has the advantage of enabling to also use the knife without the guiding action of the position-finding protruding cutting edge portion and/or the position-finding protruding cutting edge portion can be exchanged separated from the knife separation, e.g. when the position-finding protruding cutting edge portion is more sensitive for wear and/or when a specific hatch of carcasses to be processed has specific dimensions.

In a further embodiment of the cutting device according the present invention the cutting edge of the position-finding protruding cutting edge portion may be chamfered. Not only is it easier for a chamfered (bevelled) protruding knife part to enter the carcass (to penetrate the skin and tissue) but it also enables an easier sliding of the position-finding protruding cutting edge portion along the bone of the cranium posterior side. In this respect especially the knife that is located closest to the cranium posterior side is chamfered with the bevelled side direct towards the cranium posterior side.

The invention also provides an automatic work station for cutting the head off a slaughtered animal's carcass comprising: a cutting device according the invention and as disclosed above; and a manipulator for positioning the cutting device relative to the slaughtered animal's carcass to be cut, wherein the cutting device is held by the manipulator such that it has the freedom to move towards an ideal position dependant on the forces exerted by the carcass on the position-finding protruding cutting edge portion of at least one of the knives. Such a work station enables automatic use of the knifes.

The work station may also be provided with cleaning means for cleaning the knives between subsequent cutting operations. The position-finding protruding cutting edge portion can be dimensioned such that it is not hindering the (automatic) cleaning of a knife provided with a protruding portion. The work station may also be multiple constructed so that it comprises at least two cutting devices according the present invention. Plural cutting devices enable cleaning outside the critical path of the processing, makes the work station less sensible for breakdown and/or enables maintenance and repair during processing.

The present invention also provides a method for cutting the head off a slaughtered animal's carcass comprising the processing steps: A) positioning the knives of a cutting device according the present invention on opposite sides of the neck of a carcass where the head is to be cut; B) moving the knives towards each other close to the back of the slaughtered animal's head such that the position-finding protruding cutting edge portion enters the neck and scrapes over the posterior surface of the occipital bone whereby the knives of the cutting devices are moved towards the head of the carcass where the head is to be cut; and C) further moving the knives towards each other so that the head is at least partially cut off. This method provides the advantages as already mentioned above in relation to the cutting device according the present invention and are here incorporated by reference. During the processing steps A)-C) the slaughtered animal's carcass may be hanging on the hind legs enabling easy access to the neck. To limit the danger of cross contamination the knives are cleaned in between the cutting of two subsequent carcasses, and as mentioned before such cleaning off the knives may take place while another pair of knives is cutting a carcass.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1:
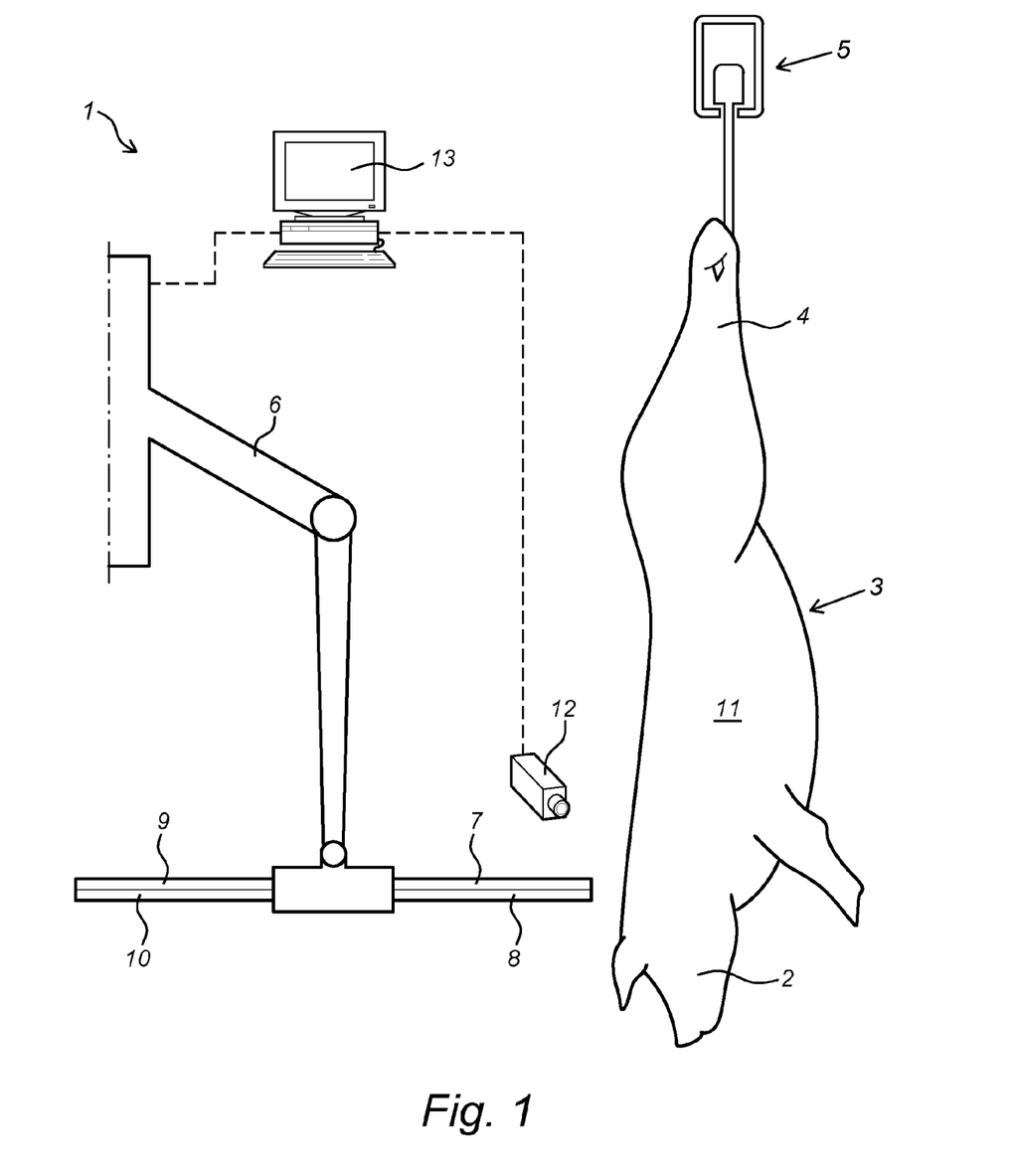
FIG. 1 a schematic view on an automatic work station for cutting the head off a slaughtered animal's carcass according the present invention.

FIG. 1 shows an automatic work station 1 for cutting the head 2 of a slaughtered animal's carcass 3 that is hanging on his hind legs 4 to an overhead transport system 5. A robot arm 6 carries two sets of knives 7,8 and 9,10. One set knives 7,8 is directed towards the slaughtered animal's carcass 3 and is to be positioned behind the head 2 of the slaughtered animal's carcass 3 to separate the head 2 from the trunk 11 of the animal's carcass 3. For positioning the set knives 7,8 the work station 1 is provided with a sensor 12 (vision system) which feeds information to an intelligent processing unit 13, which intelligent processing unit 13 is controlling the robot arm 6.

Figure 2:
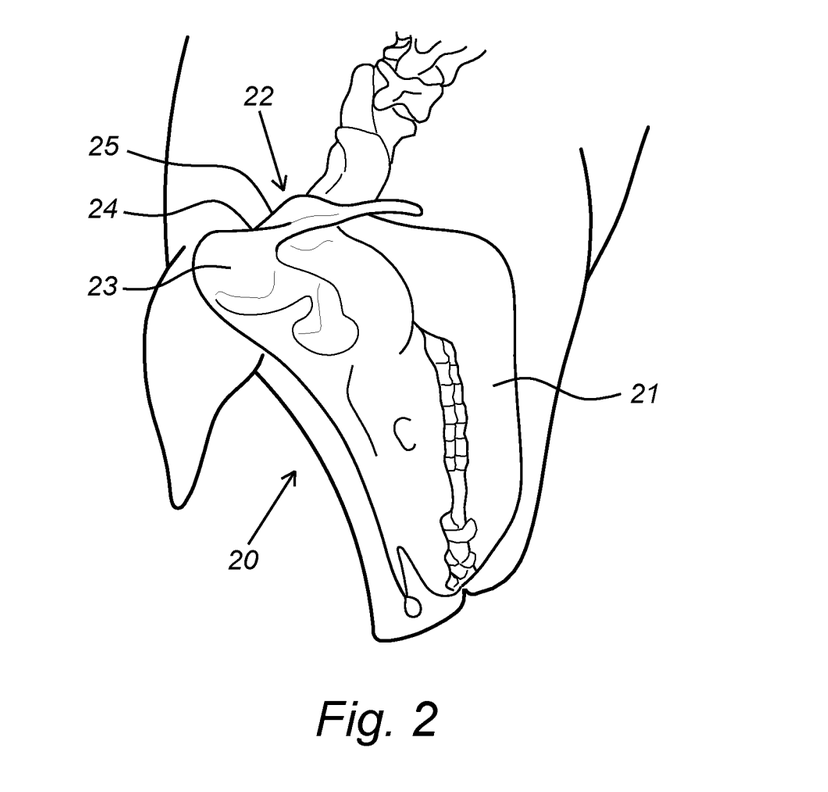
FIG. 2 a view on a pig skull before separating the head from the trunk of the animal's carcass wherein also the skull is depicted.

In FIG. 2 the head 20 of a pig is depicted including a skull 21 that is embedded in the head 20. In relation to the present invention especially the posterior surface 22 of the occipital bone 23 is of importance as will be clarified later. The posterior surface 22 of the occipital bone 23 has two slanting (sloping) more or less flat surfaces 24 of which only one is visible in this figure. The two slanting more or less flat surfaces 24 meet at a ridge 25. The shape of the two slanting more or less flat surfaces 24 of the posterior surface 22 of the occipital bone 23 (the crown of the skull) is used in guiding the knives to the location of cutting off the head 2.

Figure 3:
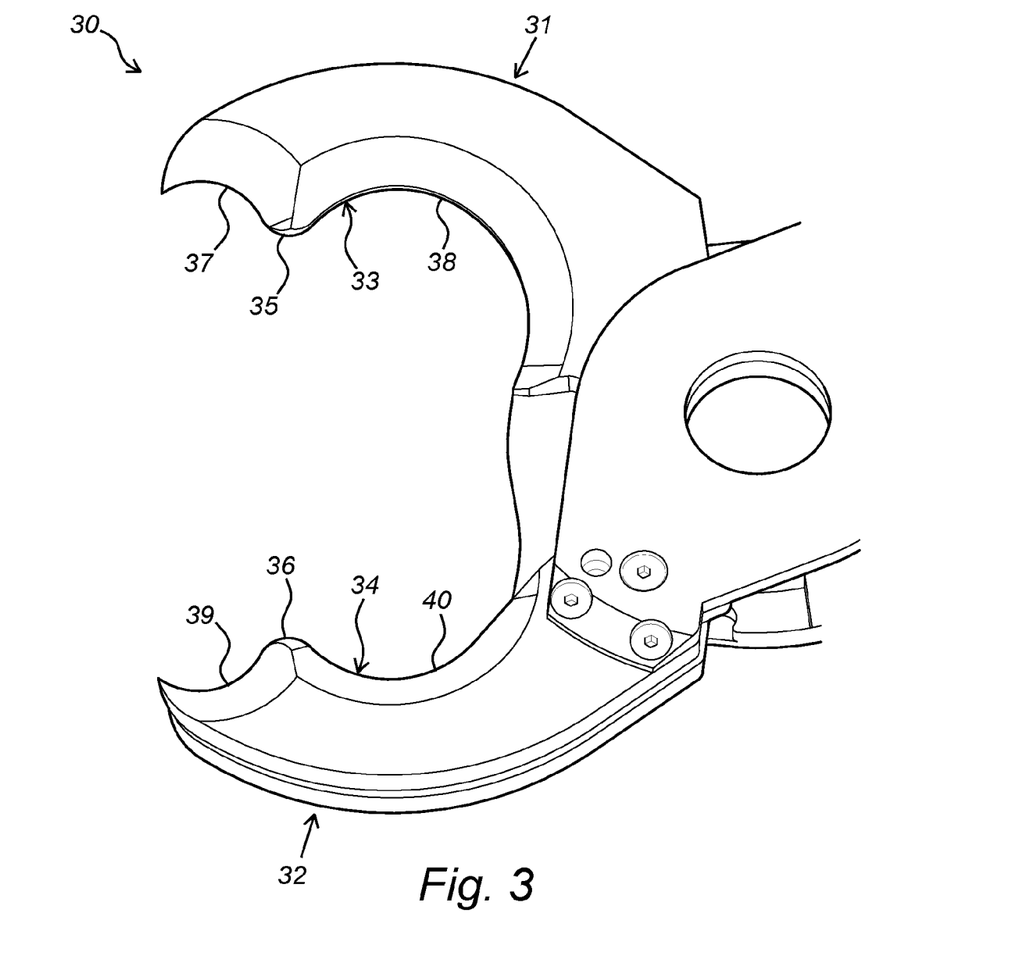
FIG. 3 a perspective view on a device for cutting the head off a slaughtered animal's carcass.

FIG. 3 shows a device 30 for cutting the head off a slaughtered animal's carcass provided with two rotational connected knives 31, 32. The knives 31, 32 are both provided with a cutting edge 33, 34 as well as that both knives 31, 32 are both provided with a position-finding protruding cutting edge portion 35, 36, These position-finding protruding cutting edge portions 35, 36 both have a forward cutting edge that protrudes compared to two-sided adjoining set back cutting edge portions 37, 38; 39, 40. The knives 31, 32 can be moved towards and away from each other to cut the head 2 of a slaughtered animal's carcass 3 (see FIG. 1). During the initial phase of the cutting the position-finding protruding cutting edge portions 35, 36 will scrape over the posterior surface 22 of the occipital bone 23 (see FIG. 2) whereby the position of the knives 31, 32 in respect of the skull 21 (see FIG. 2) is determined by the contact of the position-finding protruding cutting edge portions 35, 36 with the posterior surface 22 of the occipital bone 23. The knives 31, 32 will during cutting move towards each other (here by rotating the knives 31, 32) during which approaching the knives 31, 32 are thus moving close to the posterior surface 22 of the occipital bone 23 without cutting bone parts from the skull 21.

Figure 4:
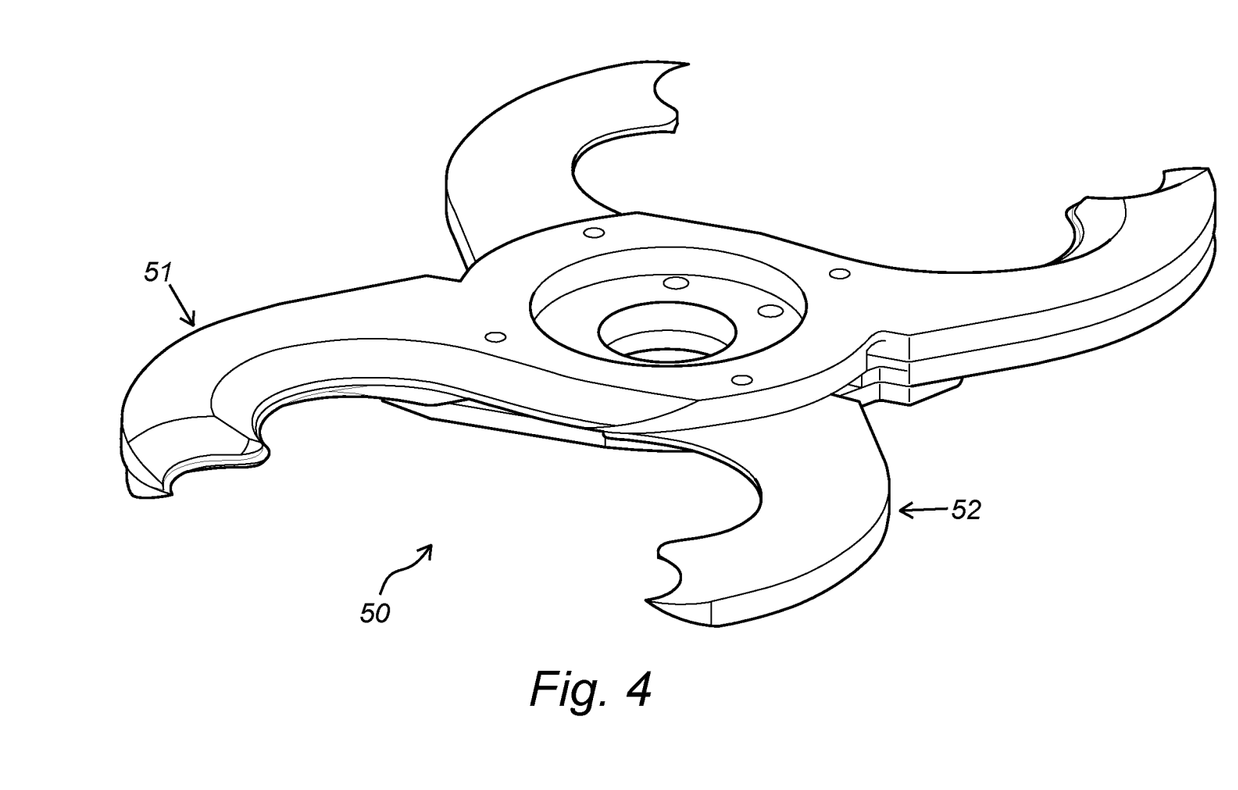
FIG. 4 a perspective view on an alternative (double) embodiment of the device for cutting the head off a slaughtered animal's carcass according the present invention.

FIG. 4 shows an alternative embodiment of a cutting device 50 according the present invention for cutting the head off a slaughtered animal's carcass. The knives 51, 52 have a two-sided design which enables to use one side of the knives 51, 52 while the other side can for instance be cleaned. It is also possible to modify the two sides of the knives 51, 52, e.g. for processing (cutting) slaughtered animals' carcasses with different dimensions.

Figure 5:
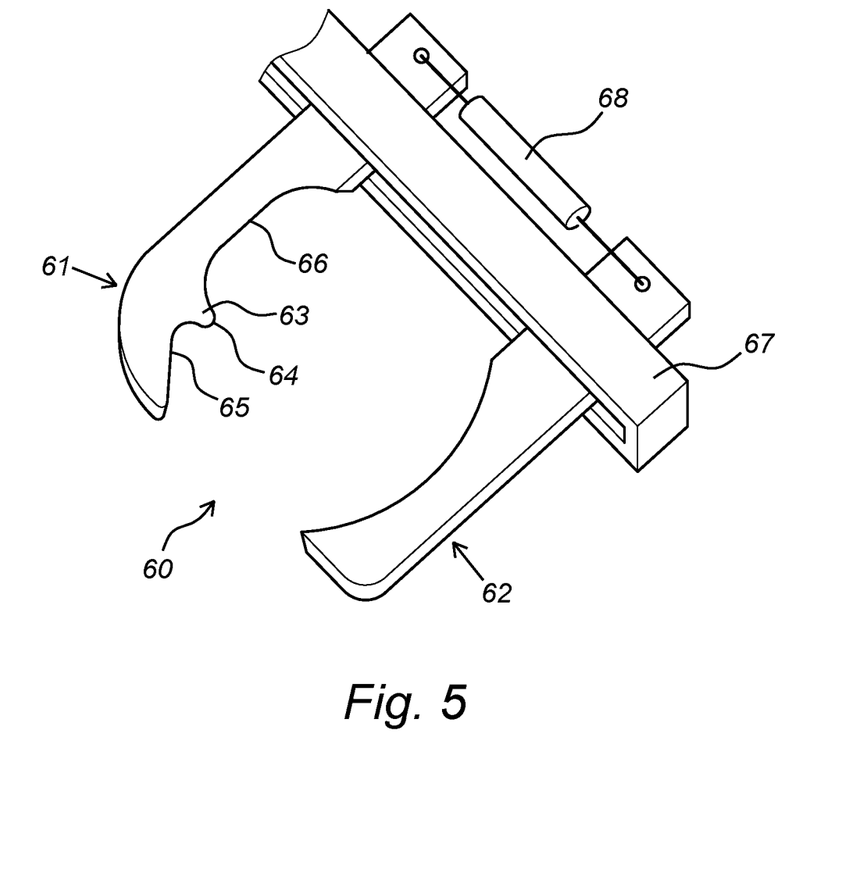
FIG. 5 a perspective view on a second alternative embodiment of the device for cutting the head off a slaughtered animal's carcass according the present invention.

FIG. 5 shows a further alternative embodiment of a cutting device 60 according the present invention for cutting the head off a slaughtered animal's carcass. The cutting device 60 is provided with two knives 61, 62 only one of the two 61 provided with a position-finding protruding cutting edge portion 63, which position-finding protruding cutting edge portion 63 has a forward cutting edge 64 that protrudes compared to two-sided adjoining set back cutting edge portions 65, 66 of the knife 61. The knives are linear moveable in a guide 67 by an actuation cylinder 68 so that during cutting they partially move along each other.

The technical features as disclosed in the various embodiments of the FIGS. 1-5 are not only disclosed in relation to the embodiment as depicted but also in combination with technical features selected form one or more of the other embodiments.

The invention claimed is:

1. A device for cutting the head off a slaughtered animal's carcass comprising:
   at least two knives, both provided with a cutting edge; and
   controls for moving the knives towards and away from each other such that the cutting edges of the knives cooperate in a cutting action,
   wherein at least one of the knives is provided with a position-finding protruding cutting edge portion, which position-finding protruding cutting edge portion has a forward cutting edge that protrudes compared to two-sided adjoining set back cutting edge portions.

2. The cutting device according to claim 1, wherein two knives are provided with a position-finding protruding cutting edge portion.

3. The cutting device according to claim 1, wherein the two knives are forming a pair of shears and the controls are comprising a rotational drive.

4. The cutting device according to claim 1, wherein the two knives are linear displaceable towards and away from each other and the controls are comprising a linear drive.

5. The cutting device according to claim 1, wherein the knives comprise a free side enabling the positioning of the neck of a carcass between moved apart knives.

6. The cutting device according to claim 1, wherein the cutting device comprises three cooperating knives.

7. The cutting device according to claim 1, wherein the knives have substantially concave curved cutting edges.

8. The cutting device according to claim 1, wherein the position-finding protruding cutting edge portion is integrated with the two-sided adjoining set back cutting edge portions.

9. The cutting device according to claim 1, wherein the position-finding protruding cutting edge portion is moveable connected with the two-sided adjoining set back cutting edge portions.

10. The cutting device according to claim 1, wherein the cutting edge of the position-finding protruding cutting edge portion is chamfered.

11. The cutting device according to claim 1, wherein the two knives continue on the side opposite to the free sides into two additional cooperating knives at least one of which additional knives is also provided with a protruding position-finding cutting edge portion.

12. An automatic work station for cutting the head off a slaughtered animal's carcass comprising:
   a cutting device according to claim 1; and
   a manipulator for positioning the cutting device relative to the slaughtered animal's carcass to be cut,
   wherein the cutting device is held by the manipulator such that it has the freedom to move towards an ideal position dependent on the forces exerted by the carcass on the position-finding protruding cutting edge portion of at least one of the knives.

13. The automatic work station for cutting the head off a slaughtered animal's carcass according to claim 12, wherein the work station is also provided with cleaning means for cleaning the knives between subsequent cutting operations.

14. The automatic work station for cutting the head off a slaughtered animal's carcass according to claim 12, wherein the work station comprises at least two of said cutting devices.

15. A method for cutting the head off a slaughtered animal's carcass comprising the processing steps:
   A) positioning the knives of a cutting device according to claim 1 on opposite sides of the neck of a carcass where the head is to be cut;
   B) moving the knives towards each other close to the back of the slaughtered animal's head such that the position-finding protruding cutting edge portion enters the neck and scrapes over the posterior surface of the occipital bone whereby the knives of the cutting devices are moved towards the head of the carcass where the head is to be cut; and
   C) further moving the knives towards each other so that the head is at least partially cut off.

16. The method for cutting the head off a slaughtered animal's carcass according to claim 15, wherein the slaughtered animal's carcass is hanging on the hind legs during the processing steps A)-C).

17. The method for cutting the head off a slaughtered animal's carcass according to claim 15, wherein the knives are cleaned in between the cutting of two subsequent carcasses.

18. The method for cutting the head off a slaughtered animal's carcass according to claim 15, wherein a pair of knives is cleaned while another pair of knives is cutting a carcass.

* * * * *

UNITED STATES PATENT AND TRADEMARK OFFICE
CERTIFICATE OF CORRECTION

PATENT NO.       : 9,781,939 B2
APPLICATION NO.  : 15/322759
DATED            : October 10, 2017
INVENTOR(S)      : Niels Antonio William Koster et al.

It is certified that error appears in the above-identified patent and that said Letters Patent is hereby corrected as shown below:

On the Title Page

Column 1, Item (72), Inventors, Line 3, delete "NC (US)" and insert -- (NL) --

Signed and Sealed this
Second Day of January, 2018

Joseph Matal
*Performing the Functions and Duties of the*
*Under Secretary of Commerce for Intellectual Property and*
*Director of the United States Patent and Trademark Office*